United States Patent [19]

Reid

[11] Patent Number: 4,546,896
[45] Date of Patent: Oct. 15, 1985

[54] COLLAPSIBLE SHIPPING CONTAINER

[75] Inventor: Gilbert M. Reid, Uxbridge, Canada

[73] Assignee: The Cypress Group Limited, Port Perry, Canada

[21] Appl. No.: 565,579

[22] Filed: Dec. 27, 1983

[30] Foreign Application Priority Data

Nov. 30, 1983 [CA] Canada .................................. 442297

[51] Int. Cl.[4] ............................................ B65D 7/26
[52] U.S. Cl. .................................... 220/4 F; 220/1.5; 220/6
[58] Field of Search .................. 220/4 R, 4 F, 4 A, 6, 220/1.5, 4 C

[56] References Cited

U.S. PATENT DOCUMENTS

| | | | |
|---|---|---|---|
| 2,756,894 | 7/1956 | Phillips | 220/6 |
| 3,599,823 | 8/1971 | Morris et al. | 220/4 F |
| 3,602,388 | 8/1971 | Hurkamp | 220/6 X |
| 3,684,122 | 8/1972 | Bonomi | 220/1.5 |
| 3,760,970 | 9/1973 | Lutz | 220/4 F |
| 3,809,278 | 5/1974 | Csumrik | 220/4 F |
| 3,941,271 | 3/1976 | Zarges et al. | 220/4 F X |
| 4,044,910 | 8/1977 | Box | 220/6 X |
| 4,230,227 | 10/1980 | Kowall et al. | 206/600 |

Primary Examiner—Steven M. Pollard
Attorney, Agent, or Firm—Riches, McKenzie & Herbert

[57] ABSTRACT

This invention relates to a reusable shipping container which is higher than it is wide and can be collapsed from an erect position within itself for storage or transport. The walls of the container have lower portions fixed to the floor to form a hollow rigid base and removable upper portions. The upper portions have a channel running along their lower edges so that, in the erect position, they can be mounted on the lower portions and engaged to each other. The side walls are spaced apart a distance greater than the height of the upper portions so that, in the collapsed position, they can be stored horizontally in the hollow base. The roof has a similar downwardly open channel running around its edges which engages the upper edges of the upper portions of the walls in the erect position, and the upper edges of the lower portions of the walls in the collapsed position. Thus, in the collapsed position, the container is still a seal unit, but is considerably reduced in height so that several of them may be stacked in the same space required by an erect container which reduces storage and/or shipping costs.

10 Claims, 4 Drawing Figures

COLLAPSIBLE SHIPPING CONTAINER

BACKGROUND OF THE INVENTION

This invention relates to shipping containers and more particularly to a shipping container which is higher than it is wide and can be collapsed within itself for storage or transport.

Knockdown shipping containers which can be collapsed within themselves to reduce space for storage or return transport have been well known for some time. Examples of this are disclosed in U.S. Pat. Nos. 3,760,970 to Lutz which issued Sept. 25, 1973 and 3,809,278 to Csumrik which issued May 7, 1974. In situations where containers which have been emptied are regularly stored or "deadheaded" back to the shipper, it is important that they be reducible in size, but it is also important that they are easily collapsed and reassembled and that they are sturdy in the erect position. More recently, since containerized shipping has become very common, bulk or piggyback containers have come into widespread use. While there are different types of bulk containers, a common characteristic or requirement is that they be rectangular shaped and higher than they are wide. With this size restriction, it is apparent that the sides are larger than the floor and thus cannot be collapsed to a horizontal position in the normal manner without projecting beyond the edge of the floor. Thus, the "package" formed by the collapsed container is not as suitable for shipping, stacking or storage as desired.

Thus, it is an object of the present invention to at least partially overcome the disadvantages of the prior art by providing a shipping container with sides having upper and lower portions, the height of the upper portions being less than the width of the container. U.S. Pat. No. 4,230,227 to Kowall et al. which issued Oct. 28, 1980 does show a container with upper and lower side portions, but the upper portions are foldable outward to facilitate loading and the problem of collapsing a container with walls higher than its width is not dealt with.

SUMMARY OF THE INVENTION

To this end, in one of its aspects, the invention provides a rectangular container which is convertible between erect and collapsed positions and in the erect position is higher than it is wide comprising a floor, a pair of side walls, first and second end walls, and a roof, each of the side and end walls having an upper portion and a lower portion, the lower portions extending along respective edges of the floor to form a rigid base with the lower portions of the side walls being spaced apart a distance greater than the height of the upper portions of the side walls, the upper portions of the side and end walls being disengageable from each other and the roof whereby, in the collapsed position, the upper portions of the side and end walls are received in the base and the roof is supported by the lower portions of the side and end walls.

Further objects and advantages of the invention will appear from the following description taken together with the accompanying drawings

DETAILED DESCRIPTION OF THE DRAWINGS

Figure 1:
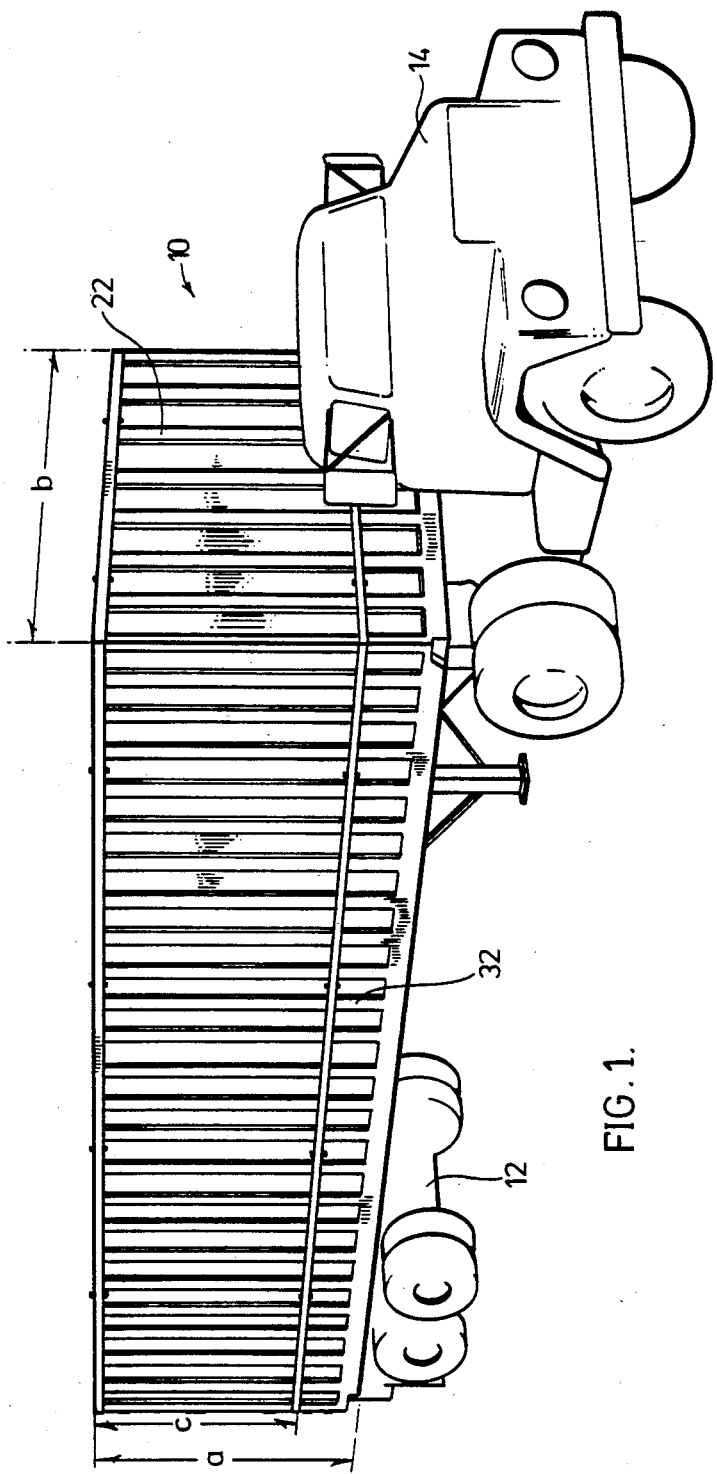
FIG. 1 is an isometric view showing a shipping container in the erect position according to a preferred embodiment of the invention mounted on the chassis of a tractor-trailer.

Reference is first made to FIG. 1 which show a shipping container 10 which is in the erect position mounted on the chassis 12 of a tractor-trailer 14. As may be seen more clearly by referring to the embodiment shown in FIG. 4, the container 10 has a floor 16, a pair of elongated side walls, front and rear 18,20, end walls 22,24 and a roof 26. Each of the side walls 18,20 have an upper portion 28,30 and a lower portion 32,34, and each of the end walls 22,24 also have an upper portion 36,38 and a lower portion 40,42. As shown, the lower portions 30,34,38 and 42 extend along the edges of the floor 16 and are fixed to each other to form a rigid hollow base 44.

Figure 2:
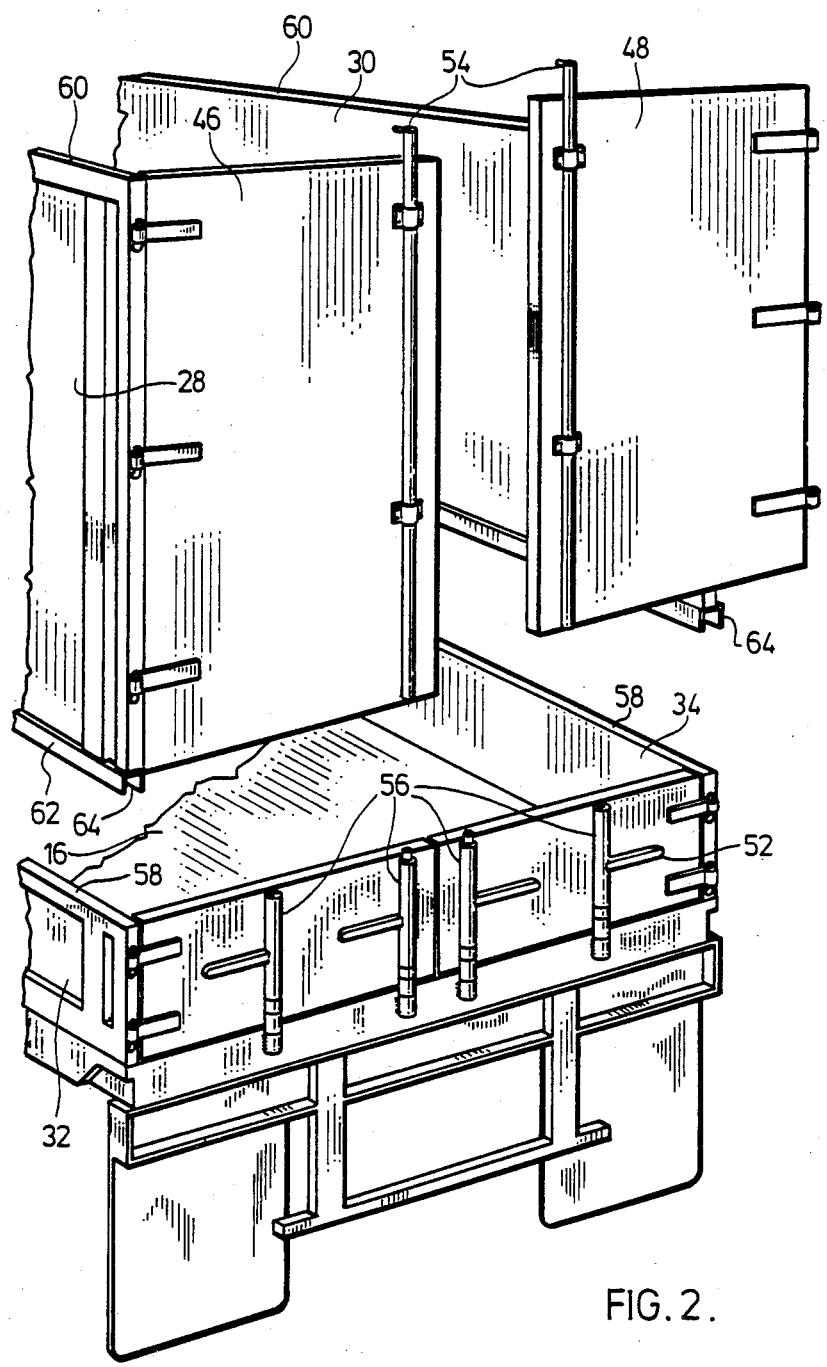
FIG. 2 shows the rear of the container seen in FIG. 1.

As may be seen in FIG. 2, in the preferred embodiment, the upper portion 36 of the rear end wall 24 is formed of a pair of upper doors 46,48, each of which is removably hinged to a respective one of the upper portions 28,30 of the side walls 18,20. Similarly, the lower portion 40 of the rear end wall 24 is formed of a pair of lower doors 50,52, each of which is hinged to one of the lower portions 32,34 of the side walls 18,20. Each set of doors has a conventional latching and locking mechanism 54,56 for keeping them closed during use.

In this embodiment the walls of the container are formed of aluminum to reduce weight and the floor 16 is formed of wooden planking laid over an I beam frame. The side walls 18,20 and the front end wall 22 have a ribbed construction to increase their structural strength and their lower portions 32,34,40 which extend from the frame of the floor 16 to form the rigid base 44 have continuous flanged upper edges 58. The upper portions 28,30,36 of the side walls 18,20 and the front end wall 22 similarly each have flanged upper edges 60, as well as lower edges 62 which are shaped to form downwardly open U-shaped channels 64. In the erect position, these upper portions 28,30,36 are secured together and to the respective lower portions 32,34,40 by bolts 66 with the upper edges 58 of the lower portions received in the U-shaped channels 64 of the upper portions to retain them in aligned positions.

The roof 26 has a similar downwardly opening U-shaped channel 68 extending along its edges. This channel 68 is shaped to receive the upper edges 60 of the upper portions 28,30,36 to retain them in the erect position, and to receive the upper edges 58 of the lower portions 32,34,40 in the collapsed positions. While the roof 26 is shown as being secured in these positions by bolts 66, it will be apparent that other releasable securing means may be used instead. For instance, in the erect position, it may be more convenient to use turnbuckles extending on the inside of the container from the roof 26 to brackets (not shown) attached to the inside of the walls. Similarly, alternate arrangements may be used on the inside of the container to secure the upper wall portions together and to the lower wall portions in the erect position to provide additional security.

Figure 3:
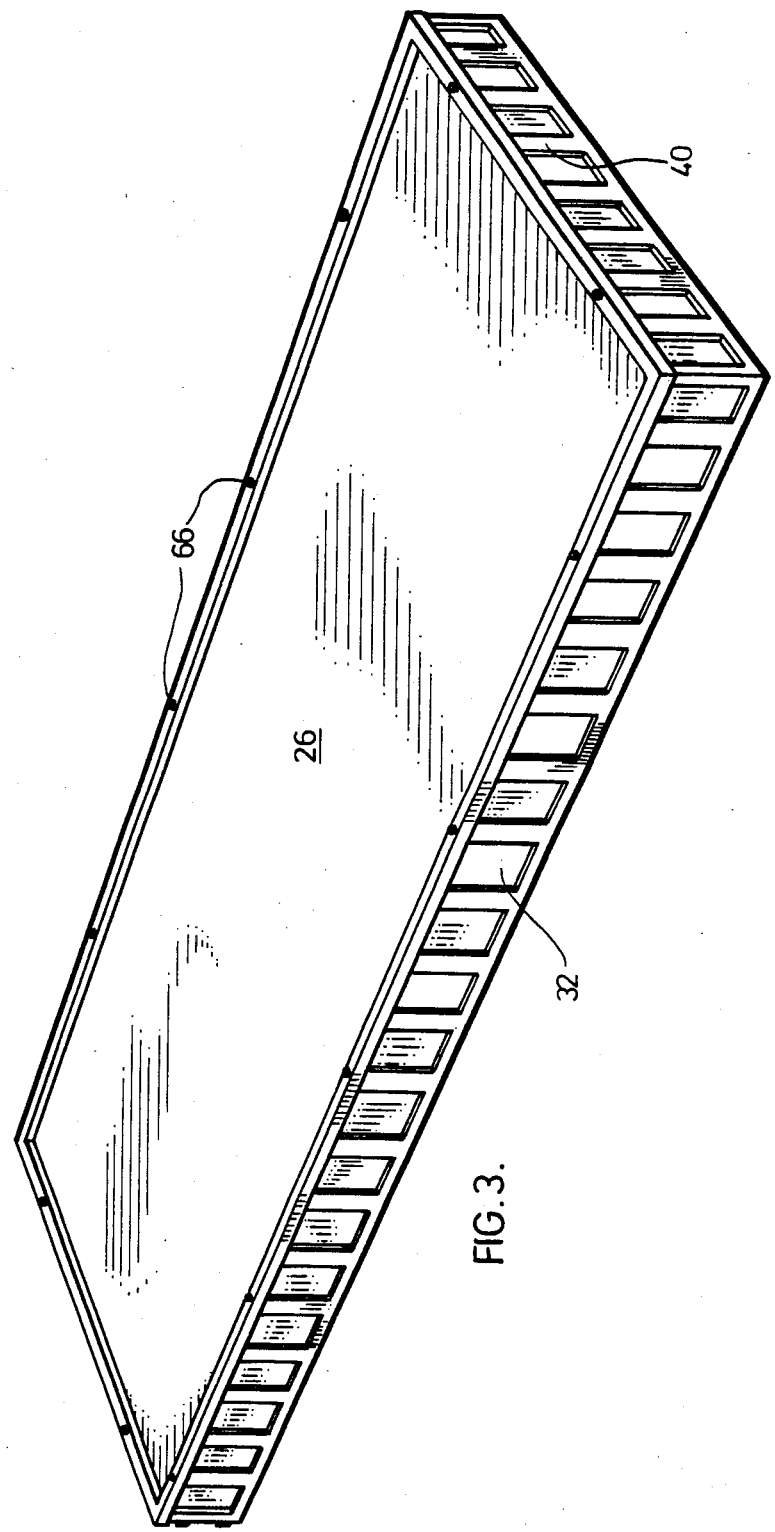
FIG. 3 is an isometric view of the same container in the collapsed position.

In use, the erect container 10 mounted on a tractor-trailer as shown in FIG. 1 is filled with goods for delivery to a desired destination. As may be seen in FIG. 2, both the upper doors 46,48 and the lower doors 50,52 open to provide full access to the rear end of the container for loading and unloading. After the goods have been unloaded at the destination, the container 10 is quickly and easily collapsed as follows. First, the bolts 66 holding the roof 26 are undone and it is removed using an overhead hoist (not shown). Then the upper doors 46,48 are lifted off their hinges and placed in the base 44. Then the bolts holding the front end wall 22 and the side walls 18,20 are undone and they are removed and placed horizontally in the base 44 on top of the upper doors 46,48. Finally, the roof 26 is relocated on the base 44 and bolted into place to form the sealed unit shown in FIG. 3. The U-shaped channel 68 extending around the edges of the roof 26 receives the upper edges 58 of the lower portions 28,30,36 and engages the lower doors 50,52 to prevent them from accidently opening. Thus, in the collapsed position, the height of the container 10 is reduced considerably so that several of them may be stacked in the same space required by an erect container to considerably reduce return shipping costs.

As may be seen, this concept of the walls of the container having fixed lower portions and removable upper portions provides for the collapse within itself of containers where this has not previously been possible. This applies to containers having walls of an outside height a which is greater than the inside width between the side walls b, which, in turn, is greater than the outside height c of the outer portions of the walls.

When the collapsed container has been returned to its point of origin or another shipping point, it can conveniently be reassembled by reversing this process. While many possible variations of this container will occur to those skilled in the art, standardization is preferred as it provides for the interchangeability of parts.

Figure 4:
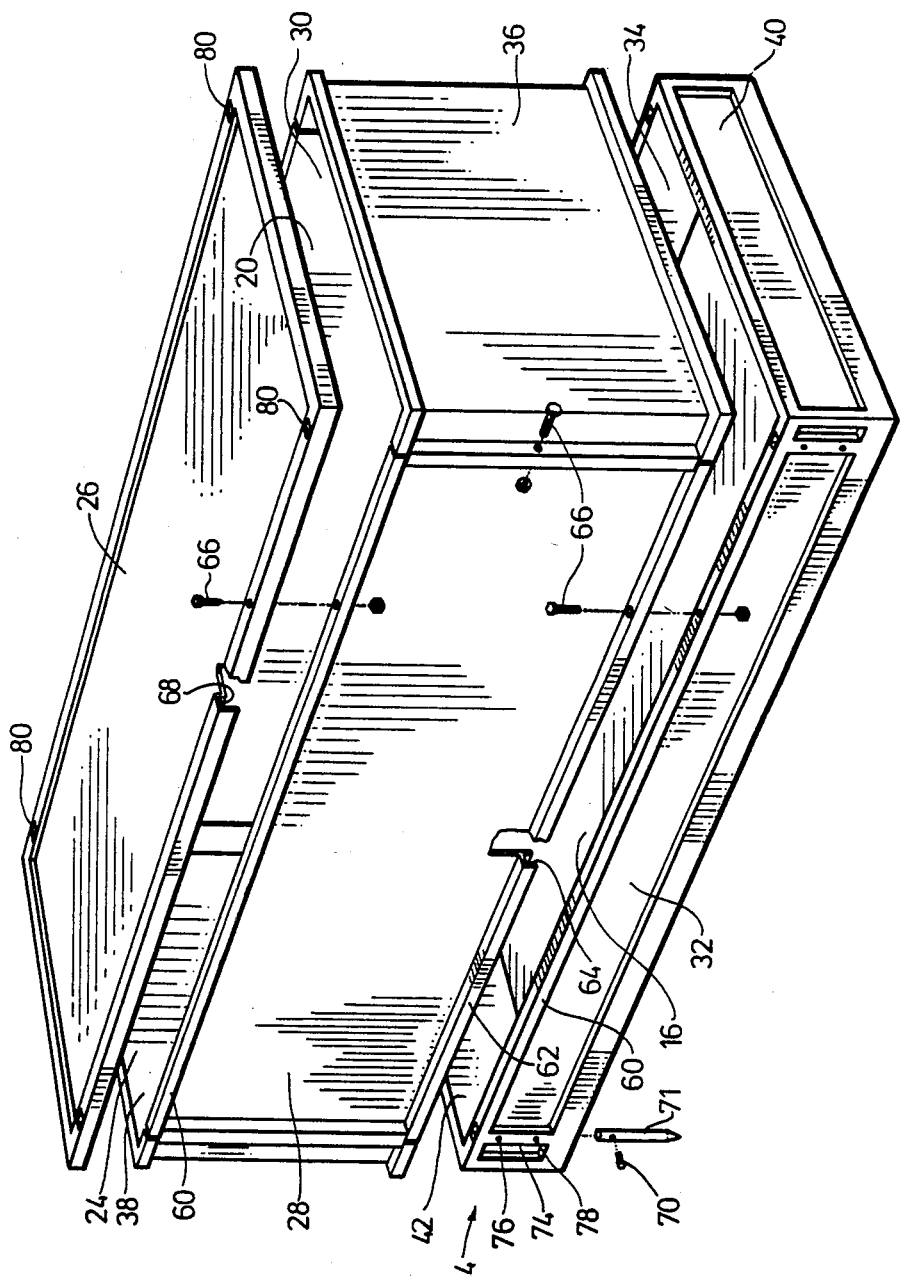
FIG. 4 is an exploded isometric view of an alternate embodiment of the invention.

An alternate embodiment is shown in FIG. 4 in which no doors are provided. While the end walls 22,24 are shown as extending slightly around to the sides to provide additional strength, it is apparent that a variety of different wall structures can be used. For instance, rather than each of the upper portions 28,30 of the side walls 18,20 and the roof 26 being a single elongated panel, they can each be formed of two or more separate panels which are fastened together by bolts or other means during erection. This has the advantage of reducing the weight of any one panel, but increases erection time. In this embodiment, pins 70 which are located by bolts 72 in vertical channels 74 on the lower portions 32,34 of the side walls are provided to facilitate stacking of the collapsed containers. In the erect position, each bolt 72 is inserted through the upper hole 76 to retain the pin 70 completely inside the channel 74. When the container is collapsed and stacked on top of another container, the bolt 72 is removed and inserted through the lower hole 78 and the pin 70 projects downwardly through a hole 80 in the channel 68 around the roof 26 of the container below to secure the containers relative to each other. Generally, the structure and use of this embodiment is the same as that described above, and the description need not be repeated.

Although, the description of this invention has been given with respect to particular embodiments, it is not to be construed in a limiting sense. Many variations and modifications will occur to those skilled in the art. For instance, the upper portions of the walls can be hinged to the lower portions, whereby they are folded into the base in the collapsed position. For a definition of the invention, reference is made to the appended claims.

What I claim is:

1. A rectangular container which is convertible between erect and collapsed positions and in the erect position is higher than it is wide comprising a floor, a pair of side walls, first and second end walls, and a roof, each of the side and end walls having an upper portion and a lower portion, the lower portions extending along respective edges of the floor to form a rigid base with the lower portions of the side walls being spaced apart a distance greater than the height of the upper portions of the side walls, the upper portions of the side and end walls each being removably mounted on a respective lower portion in the erect position, the upper portions being disengageable from each other and the roof whereby, in the collapsed position, the upper portions of the side and end walls are received in the base and the roof is seated on the lower portions of the side and end walls to form a closed unit.

2. A collapsible container as claimed in claim 1 wherein the upper portions of at least the side walls and the first end wall each have a lower edge which is in bearing contact with an upper edge of a respective lower portion of said walls in the erect position, the abutting upper and lower edges of the upper and lower portions having first retaining means to retain them in alignment in the erect position.

3. A collapsible container as claimed in claim 2 wherein the lower edge of each of said upper portions has a downwardly opening channel which receives the upper edge of the respective lower portion.

4. A collapsible container as claimed in claim 2 wherein the roof has second retaining means along its outer edges to engage upper edges of the upper portions of at least the side walls and the first end wall in the erect position and upper edges of the lower portions of at least the side walls and the first end wall in the collapsed position.

5. A collapsible container as claimed in claim 4 wherein the roof has a downwardly opening channel extending along its edges which receives the upper edges of the upper portions of at least the side walls and the first end wall in the erect position and the upper edges of the lower portions of at least the side walls and the first end wall in the collapsed position.

6. A collapsible container as claimed in claim 4 including first securing means to releasably secure the roof to the upper portions of the side and end walls in the erect position and to the lower portions of the side and end walls in the collapsed position.

7. A collapsible container as claimed in claim 4 wherein each side wall is formed of a plurality of horizontally adjacent interconnected panels which are individually removable to be received in the base in the collapsed position.

8. A collapsible container as claimed in claim 2 including first securing means to releasably secure the upper portions of at least the side walls and the first end wall to the respective lower portions of said walls in the erect position.

9. A rectangular container which is convertible between erect and collaspsed positions and in the erect position is higher than it is wide comprising a floor, a pair of side walls, first and second end walls, and a roof, each of the side and end walls having an upper portion and a lower portion, the lower portions extending along respective edges of the floor to form a rigid base with the lower portions of the side walls being spaced apart a distance greater than the height of the upper portions of the side walls, the upper portions of the side and end walls each being removably mounted in a respective lower portion in the erect position, the upper portions being disengageable from each other and the roof whereby, in the collapsed position, the upper portions of the side and end walls are received in the base and the roof is supported by the lower portions of the side and end walls, the upper portion of the second end wall comprising at least one upper door, the lower portion of the second end wall comprising at least one lower door, the said at least one upper door being removable in the collapsed position, the said upper and lower doors being openable to provide access to the container in the erect position.

10. A collapsible container as claimed in claim 9 wherein the upper portion of the second end wall comprises a pair of upper doors each of which are removably hinged to opposite side walls, and the lower portion of the second end wall comprises a pair of lower doors each of which are removably hinged to opposite side walls, each of the doors having suitable closure means to keep them closed during use.

* * * * *